(12) United States Patent
Sluz et al.

(10) Patent No.: US 8,897,657 B2
(45) Date of Patent: Nov. 25, 2014

(54) APPARATUS AND METHOD FOR STABILIZING POWER TO AN OPTICAL MULTIMODE RECEIVER

(75) Inventors: Joseph E. Sluz, Ellicott City, MD (US); Juan C. Juarez, Windsor Mill, MD (US); David W. Young, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 309 days.

(21) Appl. No.: 13/029,768

(22) Filed: Feb. 17, 2011

(65) Prior Publication Data

US 2011/0206386 A1 Aug. 25, 2011

Related U.S. Application Data

(60) Provisional application No. 61/305,356, filed on Feb. 17, 2010.

(51) Int. Cl.
*H04B 10/06* (2006.01)
*H04B 10/67* (2013.01)
*H04B 10/2581* (2013.01)

(52) U.S. Cl.
CPC .......... *H04B 10/674* (2013.01); *H04B 10/2581* (2013.01)
USPC ...... 398/213; 398/212; 398/202; 359/337.13; 359/333

(58) Field of Classification Search
None
See application file for complete search history.

(56) References Cited

U.S. PATENT DOCUMENTS

| | | | |
|---|---|---|---|
| 5,278,686 A * | 1/1994 | Grasso et al. | 398/15 |
| 6,625,340 B1 | 9/2003 | Sparks et al. | |
| 6,734,411 B1 | 5/2004 | Imbsei et al. | |
| 7,062,168 B1 * | 6/2006 | Atwell et al. | 398/38 |
| 7,283,750 B2 | 10/2007 | Tian et al. | |
| 7,313,295 B2 | 12/2007 | Ghandi et al. | |
| 7,345,811 B2 * | 3/2008 | Fisher | 359/337.2 |
| 7,414,728 B2 | 8/2008 | Caplan | |
| 7,542,675 B1 | 6/2009 | Graves et al. | |
| 2002/0171896 A1 | 11/2002 | Clark et al. | |
| 2003/0026581 A1 * | 2/2003 | Sharp et al. | 385/140 |
| 2003/0090765 A1 | 5/2003 | Neff et al. | |
| 2005/0025504 A1 * | 2/2005 | Huang et al. | 398/202 |
| 2007/0183776 A1 * | 8/2007 | Stuart et al. | 398/38 |
| 2008/0192333 A1 * | 8/2008 | Bolshtyansky et al. | 359/334 |
| 2008/0253764 A1 * | 10/2008 | Collings et al. | 398/37 |
| 2010/0098426 A1 | 4/2010 | Cornish et al. | |
| 2010/0129079 A1 | 5/2010 | Bato et al. | |

* cited by examiner

*Primary Examiner* — Ken Vanderpuye
*Assistant Examiner* — Merlin Brito Peguero
(74) *Attorney, Agent, or Firm* — Noah J. Hayward

(57) ABSTRACT

To stabilize power to an optical multimode receiver a multimode variable optical attenuator is connected to the receiver with the attenuator's voltage being controlled using a feedback signal provided by an output detector, the signal being processed using a control algorithm based on proportional-integrate-differential theory.

12 Claims, 4 Drawing Sheets

APPARATUS AND METHOD FOR STABILIZING POWER TO AN OPTICAL MULTIMODE RECEIVER

CROSS-REFERENCE TO RELATED APPLICATIONS

This application relates to U.S. provisional application No. 61/305,356, filed on Feb. 17, 2010, which is incorporated herein by reference in its entirety.

STATEMENT OF GOVERNMENTAL INTEREST

This invention was made with U.S. Government support under Department of the Air Force contract number FA8650-04-D-2413. The U.S. Government has certain rights in the invention.

BACKGROUND OF THE INVENTION

The present invention relates to an apparatus and method for optical multimode receiver power stabilization and protection particularly in free space optical systems.

Free Space Optical (FSO) propagation results in large fluctuations of optical receive power. The fluctuations can result in bit errors in optical receivers where it is desirable to stabilize the optical power and establish the best signal to noise ratio prior to detection.

In single mode systems optical power stabilization can be accomplished with active low noise optical amplification with an optical gain that can be rapidly adjusted to negate the optical power fluctuations prior to detection using a PIN photodiode. In multimode systems, however, low noise, optical amplification is very difficult to achieve requiring selection of the most sensitive optical receiving device available to try to obtain the best signal to nose ratios during signal fades.

The readily available optical receiving device is the Avalanche-based Photo Diode (APD) receiver. These devices are operated at high voltages, typically in the 60V range, near the point of avalanche break down. However, a risk in using these devices with systems that have rapid fluctuations in received optical power is that cases of excess optical power in combination with the high electrical bias to the APD can very easily create the avalanche current condition and destroy the detector or follow on electrical amplifiers.

A system level design is required to ensure protection of these sensitive receivers under various conditions. A variable optical attenuator (VOA) in front of the APD can be used to protect it from high optical power situations during normal operation. However, even with a VOA responding to power fluctuations, there are several conditions that must be protected against.

In a startup condition, when the DC power is turned on, the system initial conditions tend to start from minimal attenuation, as the typical control loop will be starting from a zero condition. If optical power is present at startup, this can result in excess power being applied to the photoreceiver.

Similarly, when the optical link goes down, the receive system will drive the attenuators to a minimal attenuation state due to lack of power. If the link rapidly comes back online, a power spike can easily make it through the VOA, as the control system has a finite response time.

Therefore, at both DC power-up as well as the link outage stages of system operation, attention must be paid to provide opportunities to protect the sensitive photoreceiver from a potential over power condition. This over power condition must be implemented by the system controller when exposed to a link outage or initial power up condition to protect the receiver.

Also, vital to system operation is the correct sensing and control of optical power. Multimode device performance can vary dependent upon the excited modes contained in the fiber. The performance of multimode devices to different modes is usually not specified; often the only specification that is provided is to the fundamental mode or the case when all modes are excited.

In FSO applications, all modes are often not excited which results in unexpected or unknown behavior from multimode devices. For example, this could result in varying coupling ratios in optical couplers and varying attenuation in optical attenuators dependent upon the modes present. Specific designs that are non-modal dependent are found to be a critical choice in a Free Space Optical receiver system design for proper performance.

In order to stabilize optical power, the system must have an accurate measure of optical power, and have a precise ability to control the power when setting the attenuator. Various technologies for implementing optical couplers exist, but not all can consistently maintain their specified coupling ratio for various mode loading conditions. One type of couplers that have been proven to work optimally for multimode applications are thin-film couplers.

Similarly the attenuator design must also provide consistent attenuation with varying mode structure. For example, in MEMS based VOAs, the beam inside the attenuator is either partially blocked or mis-pointed to decrease the power level through the device. Depending on which modes are excited, the attenuation levels vary leading to unexpected system performance.

In multimode systems, amplification is not yet a readily available option, so variable optical attenuation must be used for power stabilization. Multimode optical attenuators can have highly temperature dependent non-monotonic nonlinear attenuation responses versus drive signal. Since a control system prefers a linear function, such devices create excess demands on the signal processor. What is needed then are an apparatus and method to handle these optical devices in an efficient manner to allow a standard embedded processor to control the devices with an efficient computation so control loop times can be maintained to provide an acceptable system response time.

SUMMARY OF THE INVENTION

Therefore, the present invention has been made in view of the above problems and constraints, and provides an apparatus and method to achieve the above objectives.

The present invention is directed to an apparatus for stabilizing power to an optical multimode receiver comprising: a multimode variable optical attenuator operatively connected to the receiver; a means for controlling a voltage of the attenuator to vary the attenuation inversely to the received optical power; and an output detector for receiving an output of the attenuator and providing a feedback signal to the means for controlling.

The present invention is further directed to an apparatus for stabilizing power to an optical multimode receiver comprising: at least two multimode variable optical attenuators operatively connected in series and to the receiver; a means for controlling a voltage of the attenuators to vary the attenuation inversely to the received optical power; a detector for receiving input to or output from the attenuator and providing feedback to the means for controlling; and an optical switch operatively connected between the attenuators and the receiver, the switch being controlled by the means for controlling.

The present invention is further directed to a method for controlling a variable optical attenuator to stabilize power to a multimode optical receiver comprising: characterizing the curve of attenuation versus voltage in the attenuator over a range of temperatures; curve fitting the attenuation versus voltage to temperature; inputting the curve fitted attenuation versus voltage to temperature to a processor; outputting a value using a proportional-integrate-differential algorithm; scaling a plurality of parameters to allow only integer operations; and calculating a desired attenuator voltage using the outputted value to control the attenuator.

In summary, the multimode free space optical receiving apparatus and method of the invention provides:

A control method which sequences the optical attenuators and an input optical switch to protect the receiver during system start-up or when the system is unpowered;

A control method which sequences the optical attenuators and an input optical switch to protect the system with frequent free space link outages;

The couplers and attenuators used in multimode free space optical system having minimal modal dependency due to the large number of modes present in the receive fiber; and A control method that was implemented on the limited processing capabilities of an embedded 16 bit processor to successfully stabilize received optical power using non-linear, highly temperature dependent optical attenuators, providing 40 dB dynamic range and 10 µs system response time and being translatable to even more limited 8 bit class processors.

Those and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

Reference will now be made in detail to the exemplary embodiments of the present invention, examples of which are illustrated in the accompanying drawings.

Figure 1:
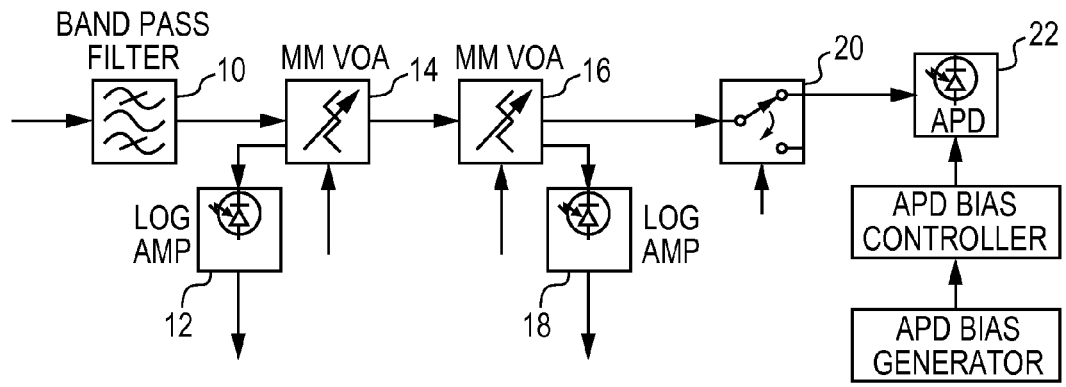
FIG. 1 is a block diagram of the optical multimode receiver stabilization apparatus of the invention.

The system components and use are illustrated in the block diagram of FIG. 1 as follows:

Bandpass Filter 10—The optical antenna terminal typically has some transmit signal leakage. Since the transmitter and receiver can be at different wavelengths, a filter can be placed at the input of the receiver to completely eliminate any transmitter leakage from affecting receiver operation.

Input Detector 12—This signal can be used if a feedforward control architecture is implemented. It also indicates the presence of any power to verify the existence of an active free space link. If the link is down and there is no optical signal, the controller (not shown in FIG. 1; an example is designated at 24 in FIG. 4) places the attenuators at maximum, to eliminate the power spike that would occur if the link is instantly present again. The input detector can be logarithmic as shown or linear.

MM VOA 14, 16—As shown, two multimode variable optical attenuators are cascaded to attain a total of 40 dB of attenuation control range.

Figure 2:
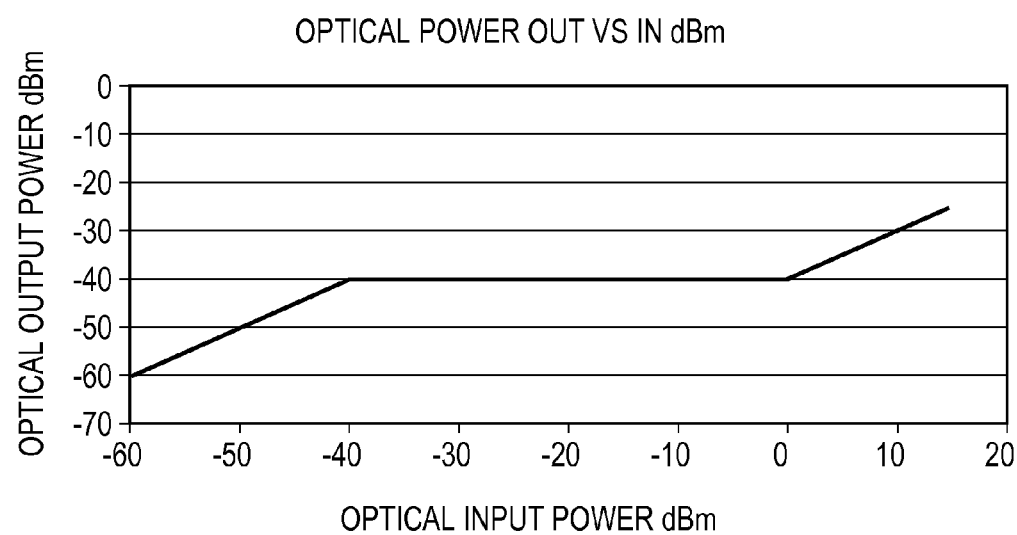
FIG. 2 is a graph of a typical passive system power out vs. power in transfer curve.

MM VOA Output Detector 18—This signal serves as the feedback signal for the controller. The controller is designed to limit the power at this point to a system designed set value. If power is below the set point, the attenuators will be set to the 0 dB set point. If power tries to go above the set point, the controllers will begin activating the attenuators. As power increases further, the attenuation will increase up to the point of 40 dB, where no further attenuation can be provided. At this point, the system output power will be uncontrolled. A typical power input/output transfer response is shown in FIG. 2. The output detector can be logarithmic or linear.

Optical Switch 20—In a full system, all field conditions must be considered to correctly design the system. One condition is system start-up. If DC power is off on the receive side, and then gets turned on when there is already an aligned free space link present the APD 22 could be exposed to excess power. A typical control loop on power up will be starting from 0 volts, which in this case means the optical attenuators are at minimum attenuation, the photodetector feedback signals start at 0 Volts, indicating no signal, forcing the controller to keep the attenuators at the minimal attenuation condition during DC power up. Dependent upon all the various circuit power up delays (including controller boot-up), as the electronic stages come fully powered, the Avalanche receiver 22, as noted above, could easily be exposed to excess optical power during start-up.

Another possibility of concern happens when the link is aligned but for some reason the system is unpowered. In this case, again the APD 22 may be exposed to excess optical power.

For the above reasons an optical switch was also added to the optical signal path after the two optical attenuators. This switch, when unpowered, disconnects the sensitive photoreceiver from the incoming signal, thus protecting it until the controller is fully capable. The two optical attenuators and their associated optical power monitors are at the system input. This allows the controller processor to always know the optical power condition and only activate the switch to connect the sensitive photoreceiver when optical power is under a controlled condition.

In a similar logic to the system start up condition, one can also envision activating this self protect behavior if the optical link goes down. The controller can then ramp the attenuators to maximum, and even deactivate the optical switch to protect the system from the condition if optical power suddenly comes back.

At system power up, the DC to the switch is naturally off, so the optical photo receiver is completely disconnected from the signal chain. Only after the processor boots and all feedback and attenuator driver control circuitry have stabilized and are ready for operation does the controller allow this switch to engage. The controller immediately sets the attenuators to maximum attenuation. If there is no optical power (no link), the controller remains in a loop state, awaiting optical power. Once optical input power is above a threshold that is defined as useful power, several delay and rechecks occur to essentially "debounce" the system, to guarantee the free space optical link has been established and is indeed stable. If a signal is not present for an even more significant amount of time, the system will also disable the optical switch, essentially returning into system start mode.

The optical switch is then activated, connecting the receiver to the signal chain, which presently has the optical attenuators set at maximum. The controller then enters the control loop state, where the feedback optical power is read and the attenuator drive is adjusted in several steps to bring the power to the desired target. If power disappears for a predefined time, the link can be declared lost and, as discussed above, the state machine described above can fall back to its initial state, protecting the receiver should power suddenly appear again.

Optical couplers (not shown)—To ensure modal independency as much as possible, optical couplers, preferably thin-film couplers, as noted previously, are used at the input to the first MM VOA (assuming two MM VOAs in this example) and input detector and at the output of the second MM VOA and input to the output detector.

To enable robust use of such sensitive receiver devices in a free space optical system where multi-decade decibel optical fluctuations occur hundreds of times a second, some form of automatic gain control is desirable. Since amplification is not yet a readily available option, variable optical attenuation must be used. The requirements on the optical attenuator are demanding. It must have low loss, as every photon lost impacts the system sensitivity. The attenuator must also have a rapid response time, have a large variable attenuation range, and be able to be controlled rapidly, on the order of one to tens of kilohertz.

A survey of available optical attenuators reveals only a few candidates. The Agiltron MM series is one example that offers up to 60 dB of attenuation range with a 0.4 dB insertion loss, but has a somewhat limiting 2.5 ms response time. The device is a MEMS based mechanical device, that also was found to have a mechanical oscillation if driven too aggressively to try to meet system speed demands.

Figure 3:
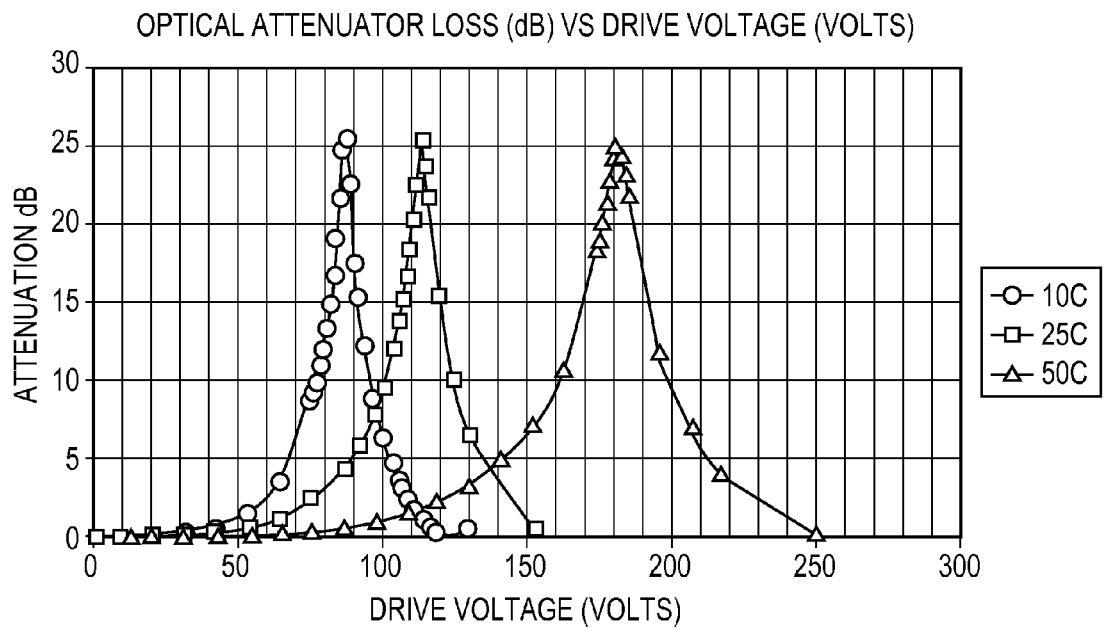
FIG. 3, is a graph of Boston Applied Technologies variable optical attenuator response vs. drive voltage at different ambient temperatures.

The preferred device is an electro-optical ceramic device based on the Eclipse series from Boston Applied Technologies. The device has 5 µs response time and can provide up to 20 dB of attenuation with a 1 dB insertion loss. However, upon testing, a user discovers the device has a highly temperature dependent, nonmonotonic, and non-linear response. A measured response of the attenuator showing attenuation versus drive voltage is shown in FIG. 3.

Furthermore, since one device only has 20 dB of attenuation range, two devices are needed in cascade to obtain a more realistic 40 dB operating attenuation range. The attenuation versus device drive and temperature were also found to vary from device-to-device.

Since the device must be used in a feedback control system, it is desired to linearize the attenuation versus drive. Frequently this can be done with a lookup table, but when the large temperature dependence is also considered, there needs to be another dimension or correction to the look up table. The non-monotonic nonlinear response makes the processing required to linearize this response very inefficient for small processors. One embodiment of the invention is the control software that was devised to efficiently control these optical attenuators using the limited processing resources contained in an 80 MIPS embedded controller such as a Microchip ds33PIC.

Figure 4:
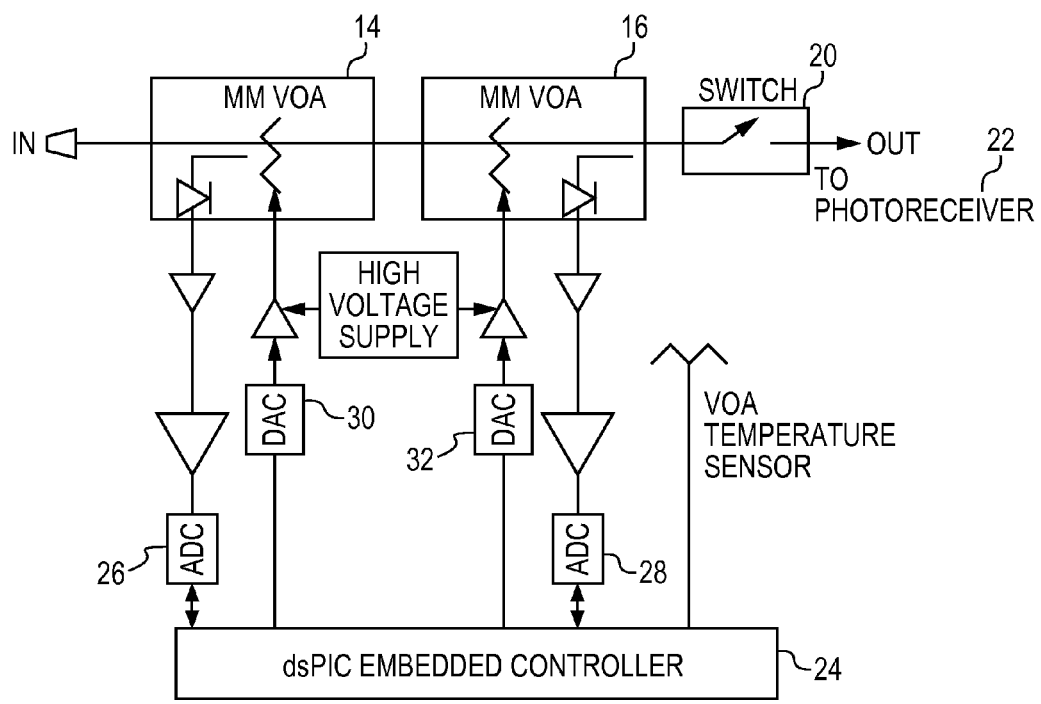
FIG. 4, is a block diagram of the full multimode receiver of the invention.

The block diagram of the full multimode receiver is shown in FIG. 4. The control consists of an embedded controller 24 that has ADC 26, 28 and DAC 30, 32 for input and output interfaces for feedback and attenuator control.

Since each device has different attenuation versus drive responses, and these vary over temperature, the following process was constructed to accomplish the efficient control of the system with reduced processor complexity. An in-situ calibration routine is included as part of the embedded software, since every device has a different shape fit and temperature response. This allows all aspects of the variations that exist between unit-unit (including ADC, DAC and buffer variations) to be measured simultaneously and accounted for. The calibration constants are calculated by the embedded device itself.

Step 1: In a temperature chamber, large constant optical power is applied to enable characterization of the curve from minimal attenuation to its peak attenuation. It is not necessary to continue increasing drive past the point where attenuation begins decreasing, so the routine traps and exits when this occurs.

This measured usable portion of the attenuation curve is then curve fit. A starting minimal loss is specified, as it is undesirable to go down to the 0 Volt drive level as shown on the curve of FIG. 3; it is better to accept some amount of loss so the voltage does not have to slew such a large amount to only move 0.5 dB. Likewise it is desired to have some safety factor rather than driving to the full peak of attenuation.

These curve limits are user settable, and typically reduce the available dynamic range by 0.5 dB total to provide some margin. It is over these limits, for example, 0.25 to 19.75 dB (for an attenuator that has a 0 to 20 dB full range from end-end) that the curve fit is performed.

Figure 5:
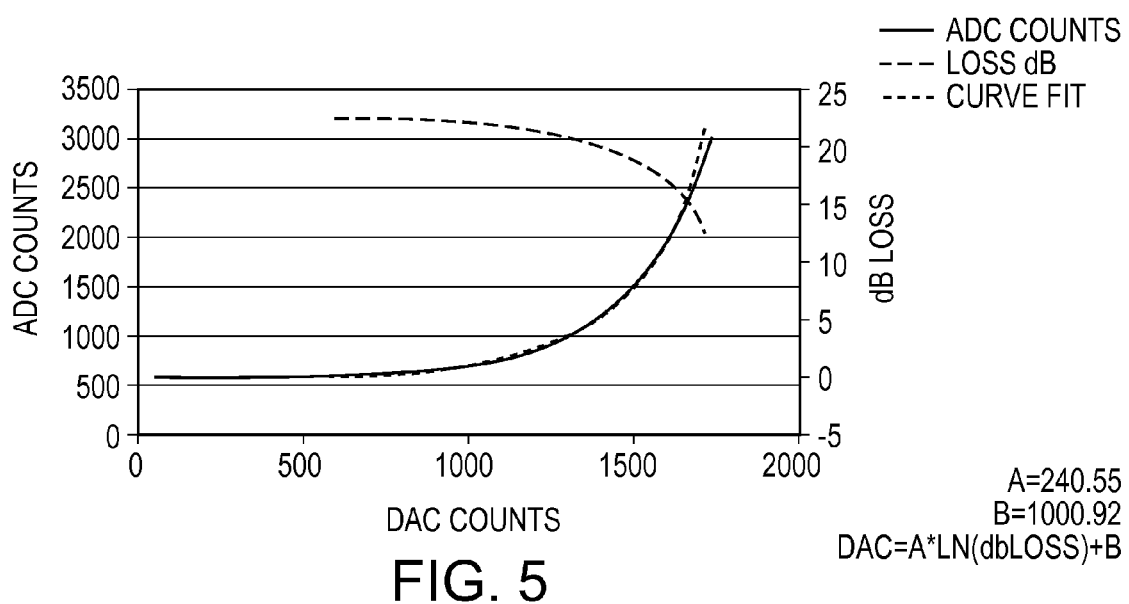
FIG. 5, is a graph illustrating measured data and logarithmic-linear curve fit.

The curve fit parameters are in terms of a Slope and Intercept. For a typical example unit, a curve fit is shown in FIG. 5 below.

Figure 6A:
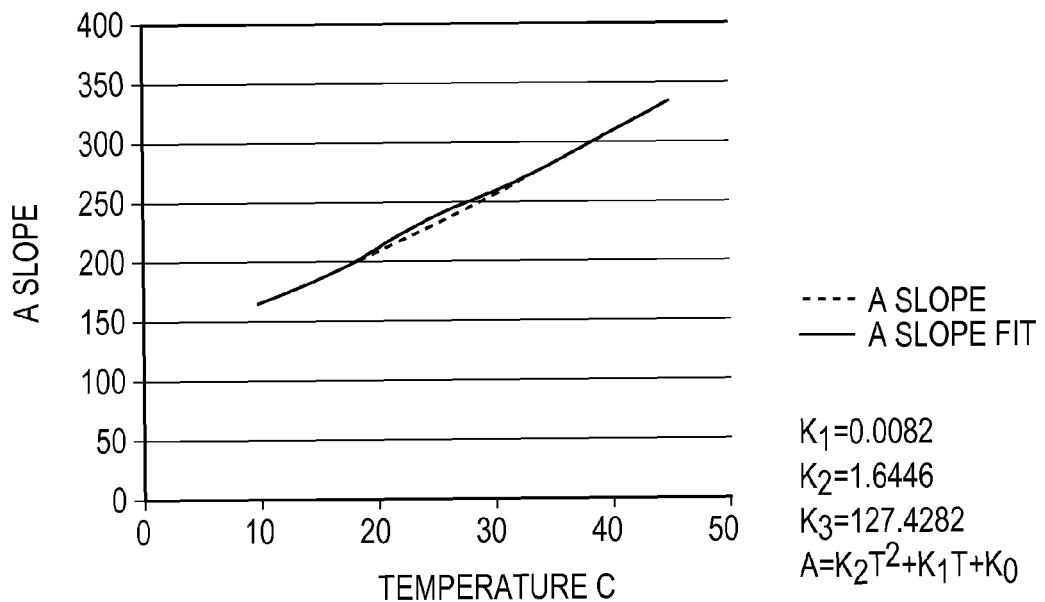
FIG. 6, consisting of FIGS. 6A and 6B, are graphs, respectively, of slope and intercept values vs. temperature, that is, curve fit of the temperature scaling values vs. temperature.
Figure 6B:
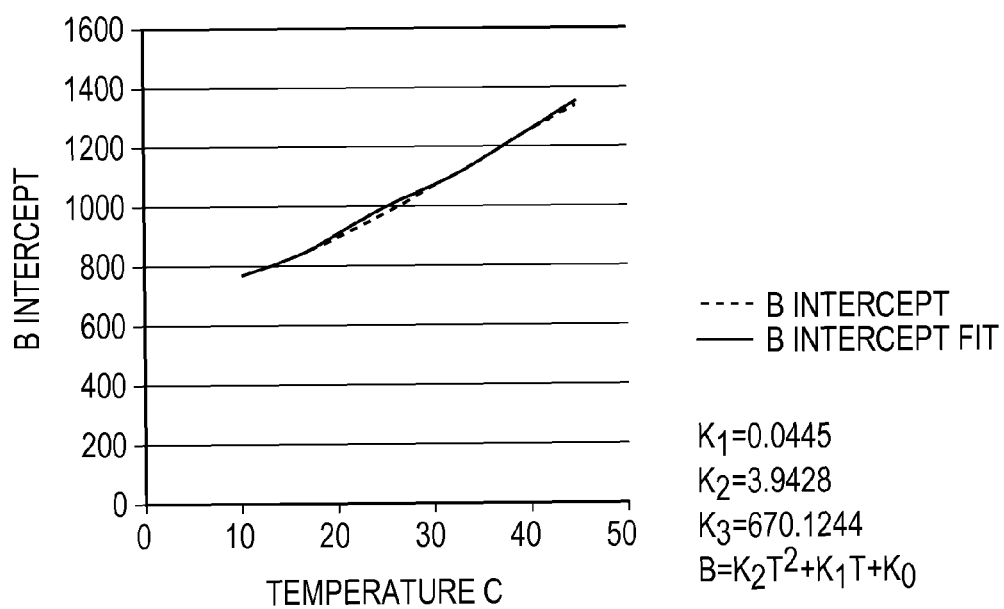

Step 2: Step 1 is repeated over the range of required operational temperatures. This provides a matrix of slope (A) and intercept (B) values versus temperature. These are plotted versus temperature below in FIGS. 6A and 6B, respectively. The slope and intercept values are curve fit to temperature via a second order equation. Slope is nearly linear, while intercept has a stronger second order behavior.

Step 3: An embedded processor excels at simple multiplies and look up table operations. Since A and B are very well behaved versus temperature, the controller can determine the drive needed for a particular attenuation at any temperature. The code in operation occasionally reads temperature, and calculates new A/B constants based on the new reading. While the actual A/B table values could be stored, this technique based on derived A/B values has a calibration advantage as each unit can be characterized by only a few specific parameters as opposed to multiple tables.

Step 4: Another table exists to provide a y=LN(x) curve scaled appropriately for non-floating point operations; this has a speed advantage over actual DSP logarithmic functions. The logarithmic table is scaled to integer proportions to avoid floating point operations.

Step 5: During system run time, the feedback ADC is read and fed to a control algorithm based on proportional-integrate-differential control (PID) theory. This PID algorithm outputs a value in proportion to the error from the desired feedback target. This value is then mapped to a DAC value to set the attenuator. The mapping is linearized via the equations obtained previously, and is corrected by the temperature settings. The required DAC value mapped to a linear relationship to insertion loss then becomes:

$$DAC_{value}=A*LN_{LUT}[\text{Control PID value output}]+B$$

Some scaling is required as these are integer operations, not floating point, similar to the logarithmic table scaling mentioned previously. Using this algorithm, loop time is sufficiently fast that the control algorithm is not the limitation of system speed, as the control device is the limiter.

To summarize, an optical element with a highly temperature dependent nonlinear response is curve fit at various temperatures. The curve fit slopes and intercept parameters are used in the curve fit in regards to their dependence upon temperature. The temperature equation which involves only a few multiply operations is done only occasionally. All parameters are scaled to allow only integer operations with insignificant loss of resolution. The result of the PID control routine can then be used to calculate a desired attenuator drive value for the DAC with just a simple linear equation involving one multiply and an addition.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. An apparatus for stabilizing power to an optical multimode receiver comprising:
   a first multimode variable optical attenuator operatively connected to the receiver;
   a second multimode variable optical attenuator operatively connected in series to the first multimode variable optical attenuator;
   an output detector for receiving an output of the second multimode variable optical attenuator;
   an optical switch operatively connected between the second multimode variable optical attenuator and the receiver, and
   a controller operatively connected to the first and second multimode variable optical attenuators, the output detector and the optical switch,
   wherein the controller is configured to:
      characterize a curve of attenuation versus voltage in at least one of the first and second multimode variable optical attenuators over a range of temperatures;
      curve fit the attenuation versus voltage to temperature;
      process the curve fitted attenuation versus voltage to temperature;
      output a value using a proportional-integrate-differential algorithm;
      scale a plurality of parameters to allow only integer operations;
      calculate a desired attenuator voltage using the outputted value to control at least one of the first and second multimode variable optical attenuators; and
      control the attenuator voltage based on the desired attenuator voltage and to control the optical switch to isolate the receiver from received optical power responsive to the received optical power being below a threshold value.

2. The apparatus as recited in claim 1, the controller further comprising a means for calibrating the first and second multimode variable optical attenuators.

3. The apparatus as recited in claim 2, wherein the means for calibrating linearizes the attenuation as a function of the voltage of the first and second multimode variable optical attenuators.

4. The apparatus as recited in claim 3, wherein the means for calibrating curve fits the attenuation versus voltage at different temperatures.

5. The apparatus as recited in claim 1, wherein the output detector is logarithmic.

6. The apparatus as recited in claim 1, wherein the output detector is linear.

7. The apparatus as recited in claim 1, further comprising a filter operatively connected to the receiver, the filter eliminating transmitter leakage to the receiver.

8. The apparatus as recited in claim 1, further comprising an input detector for receiving an input to the first and second multimode variable optical attenuators, the input detector indicating the presence or absence of an optical signal to the controller.

9. The apparatus as recited in claim 8, wherein the input detector is logarithmic.

10. The apparatus as recited in claim 8, wherein the input detector is linear.

11. An apparatus for stabilizing power to an optical multimode receiver comprising:
    at least two multimode variable optical attenuators operatively connected in series and to the receiver;
    a detector for receiving input to or output from the at least two multimode variable optical attenuators;
    an optical switch operatively connected between the attenuators and the receiver, and
    a controller operatively connected to the at least two multimode variable optical attenuators, the detector and the optical switch, the controller configured to:
       characterize a curve of attenuation versus voltage in the at least two multimode variable optical attenuators over a range of temperatures;
       curve fit the attenuation versus voltage to temperature;
       process the curve fitted attenuation versus voltage to temperature;
       output a value using a proportional-integrate-differential algorithm;
       scale a plurality of parameters to allow only integer operations;
       calculate a desired attenuator voltage using the outputted value to control the at least two multimode variable optical attenuators; and
       control the attenuator voltage based on the desired attenuator voltage and to control the optical switch to isolate the receiver from received optical power responsive to the received optical power being below a threshold value.

12. A method for controlling a variable optical attenuator to stabilize power to a multimode optical receiver comprising:
    characterizing the curve of attenuation versus voltage in the attenuator over a range of temperatures;
    curve fitting the attenuation versus voltage to temperature;
    inputting the curve fitted attenuation versus voltage to temperature to a processor;

outputting a value using a proportional-integrate-differential algorithm;

scaling a plurality of parameters to allow only integer operations;

calculating, via execution by the processor of instructions stored in a non-transitory medium, a desired attenuator voltage using the outputted value to control the attenuator; and employing the processor to control the attenuator voltage based on the desired voltage and to control an optical switch operatively connected between the variable optical attenuator and the receiver to isolate the receiver from received optical power responsive to the received optical power being below a threshold value.

\* \* \* \* \*